United States Patent [19]

Machida et al.

[11] Patent Number: 5,670,713
[45] Date of Patent: Sep. 23, 1997

[54] APPARATUS AND METHOD FOR RECOGNIZING MISFIRE OCCURRENCE IN MULTI-CYLINDER INTERNAL COMBUSTION ENGINE

[75] Inventors: Kenichi Machida, Isesaki, Japan; Klaus Ries-Muller, Bad Rappenau, Germany

[73] Assignees: Unisia Jecs Corporation, Atsugi, Japan; Robert Bosch GmbH, Stuttgart, Germany

[21] Appl. No.: 620,334

[22] Filed: Mar. 22, 1996

[30] Foreign Application Priority Data

Mar. 22, 1995 [JP] Japan .................. 7-063048

[51] Int. Cl.$^6$ .............. F02P 17/00; G01M 15/00
[52] U.S. Cl. .............. 73/116; 73/117.3; 123/419; 123/436; 364/431.07
[58] Field of Search .............. 73/116, 117.2, 73/117.3; 364/431.07, 431.08; 123/419, 425, 436

[56] References Cited

U.S. PATENT DOCUMENTS

| | | | |
|---|---|---|---|
| 5,109,825 | 5/1992 | Joos et al. | 123/479 |
| 5,117,681 | 6/1992 | Dosdall et al. | 73/116 |
| 5,184,595 | 2/1993 | Maeda et al. | 123/479 |
| 5,186,148 | 2/1993 | Wataya | 123/479 |
| 5,195,011 | 3/1993 | Giorgetta et al. | 123/479 |
| 5,197,325 | 3/1993 | Tamura et al. | 73/117.3 |
| 5,209,206 | 5/1993 | Danno et al. | 123/479 |
| 5,241,937 | 9/1993 | Kanehiro et al. | 123/425 |
| 5,260,877 | 11/1993 | Drobny et al. | 364/431.11 |
| 5,322,045 | 6/1994 | Hisaki et al. | 123/406 |
| 5,331,560 | 7/1994 | Tamura | 364/431.12 |
| 5,345,817 | 9/1994 | Grenn et al. | 73/117.3 |
| 5,373,448 | 12/1994 | Katogi et al. | 364/431.08 |
| 5,377,536 | 1/1995 | Angermaier et al. | 73/116 |
| 5,415,035 | 5/1995 | Shimaskai et al. | 73/117.3 |
| 5,442,955 | 8/1995 | Baba et al. | 73/117.3 |
| 5,452,604 | 9/1995 | Namiki et al. | 73/116 |
| 5,461,569 | 10/1995 | Hara et al. | 364/431.03 |
| 5,485,374 | 1/1996 | Takaku et al. | 73/117.3 |
| 5,503,008 | 4/1996 | Machida | 73/117.3 |
| 5,505,079 | 4/1996 | Rossignol | 73/116 |
| 5,528,929 | 6/1996 | Ikebuchi | 73/116 |
| 5,528,931 | 6/1996 | James et al. | 73/117.3 |
| 5,531,108 | 7/1996 | Feldkamp et al. | 73/117.3 |
| 5,560,341 | 10/1996 | Machida et al. | 123/479 |

FOREIGN PATENT DOCUMENTS

| | | |
|---|---|---|
| 0 433 690 A2 | 6/1991 | European Pat. Off. . |
| 0 610 508 A1 | 12/1993 | European Pat. Off. . |
| 0 611 882 A1 | 12/1993 | European Pat. Off. . |
| 5-17172 | 3/1993 | Japan . |
| 7-233753 | 9/1995 | Japan . |

Primary Examiner—George M. Dombroske
Attorney, Agent, or Firm—Foley & Lardner

[57] ABSTRACT

Apparatus and method for recognizing an absence or presence of a misfire in each of cylinders of a multi-cylinder internal combustion engine without influences of a mechanical deviation in a crank angle sensor and of a combustion state deviation between each of the cylinders. A period of each reference signal (REF) is generated from the crank angle sensor and a fuel combustion state deviation between each of the cylinders. The period of each reference signal (REF), which is generated from the crank angle sensor whenever an engine crankshaft has rotated through a predetermined crank angle expressed as 720°/n (n denotes a number of engine cylinders), is measured by a timer. A determination of the absence or presence of the misfire in each cylinder is made based on the measured period of the reference signal for each corresponding one of the cylinders. The measured period being corrected with either or both of first and second correction coefficients ($KT_i$, $KKT_j$) derived by learning the corresponding first correction coefficient for the mechanical deviation and by learning the corresponding second correction coefficient for the combustion state deviation.

13 Claims, 7 Drawing Sheets

APPARATUS AND METHOD FOR RECOGNIZING MISFIRE OCCURRENCE IN MULTI-CYLINDER INTERNAL COMBUSTION ENGINE

BACKGROUND OF THE INVENTION

1. Field of the Invention

The present invention relates to apparatus and method for recognizing a misfire occurrence in a multi-cylinder internal combustion engine.

2. Description of the Related Art

A U.S. Pat. No. 5,109,825 issued on May 5, 1992 exemplifies a previously proposed method and arrangement for recognizing misfires in a multi-cylinder internal combustion engine.

In addition, a Japanese Patent Utility Model Registration Application First Publication No. Heisei 5-17172 published on Mar. 5, 1993 exemplifies another previously proposed misfire occurrence recognizing apparatus in which a period of a reference signal REF output from a crank angle sensor is measured and a variation in an angular speed of the engine is determined on the basis of the measured period so as to determine a presence or absence of the misfire in any of the engine cylinders.

The period during which the reference signal REF is generated is needed to correspond to a constant crank angle (crankshaft rotation angle). However, in an actual practice, it is often the case that the reference signal REF cannot be generated for each of the constant crank angles due to a mechanical deviation such as a crank angle sensor positional deviation. For example, although the generation of the reference signal REF is set at each period of 180° CA (720°/n, n denotes the number of engine cylinders and is four in the case of a four-cylinder internal combustion engine), the reference signal REF is actually generated at a smaller or larger crank angular interval than a normal 180° CA. Therefore, an accuracy of the recognition of the misfire becomes lower due to the variation in the period of the generation of the reference signal REF caused by the variation in the crank angle.

It is necessary to correct the measured period of the reference signal REF so as to cope with the mechanical deviation caused by the crank angle sensor arranged positional deviation from a normal position or so on and by a combustion state deviation between the respective cylinders (the combustion states of fuel in respective engine cylinders are different from each other) in order to improve an accuracy of the misfire occurrence recognition. The variations in the periods described above due to the mechanical deviation and the combustion state deviations cannot sufficiently be distinguished. Hence, since the characteristic of the deviation in the period described above due to the mechanical deviation cannot be determined, the correction of the periods of the reference signal REF cannot be accurately carried out against either or both of the mechanical deviation and combustion state deviation.

SUMMARY OF THE INVENTION

It is, therefore, an object of the present invention to provide highly accurate apparatus and method for recognizing a misfire occurrence in any of engine cylinders in a multi-cylinder internal combustion engine by learning a mechanical deviation and by a combustion state deviation between the respective engine cylinders.

According to one aspect of the present invention there is provided with a misfire recognizing apparatus for a multi-cylinder internal combustion engine, comprising:

a) a reference signal generating sensor arranged for generating and outputting a reference signal (REF) for each of same predetermined crank angles, each thereof being expressed by 720°/n (n denoting a number of engine cylinders within the engine) and the reference signal including a cylinder number identifying signal indicating a representative one of engine cylinder numbers;

b) a second sensor arranged for detecting an engine driving condition other than an engine revolution speed; and c) a control unit, said control unit including:

d) period measuring means for measuring a period of the reference signal within one of the same predetermined crank angles, the period of the reference signal corresponding to a combustion state in a corresponding one of the respective cylinders of the engine;

e) misfire occurrence determining means for determining a presence or absence of a misfire in each cylinder on the basis of the measured period of the reference signal for the corresponding one of the engine cylinders;

f) first determining means for determining whether a fuel supply to the engine is cut off or carried out according to the detected engine driving condition;

g) first correction coefficient setting means for setting a first correction coefficient ($KT_i$, i=1, - - -, n) for each measured period of the reference signals so that stepwise variations ($\Delta T$) in the periods of the reference signals consecutively measured for all of the cylinders are mutually equal to one another when said first determining means determines that the fuel supply to the engine is cut off;

h) second determining means for determining whether the misfire occurrence determining means has determined that the absence of the misfire occurs in any engine cylinder; and i) second correction coefficient determining means for setting a second correction coefficient ($KKT_i$, i=1, - - -, n) for each measured period of the reference signals so that the respective periods of the reference signals for all of the engine cylinders, which are corrected according to the first correction coefficients set by the first correction coefficient setting means, are equal to an average value $T_{AVE}$ of the respective periods of the reference signals when the first determining means determines that the fuel supply to the engine is carried out and when said second determining means determines that the misfire occurrence determining means has determined that the absence of the misfire occurs in any engine cylinder, wherein the misfire occurrence determining means comprises: j) correction means for correcting the periods of the respective reference signals continuously measured for all of the engine cylinders according to either or both of the first and second correction coefficients set by said first and second correction coefficient setting means and said misfire occurrence determining means determines the absence or presence of the misfire in any engine cylinder on the basis of the corrected periods of the reference signals by the correction means.

According to another aspect of the present invention, there is provided with a method for recognizing a misfire occurrence in a multi-cylinder internal combustion engine, comprising the steps of:

a) generating and outputting a reference signal (REF) for each of same predetermined crank angles, each thereof being expressed by 720°/n (n denoting a number of engine cylinders within the engine) and the reference signal including a cylinder number identifying signal indicating a representative one of engine cylinder numbers;

b) detecting an engine driving condition other than an engine revolution speed;

c) measuring a period of the reference signal within one of the same predetermined crank angles, the period of the reference signal corresponding to a combustion state in a corresponding one of the respective cylinders of the engine;

d) determining a presence or absence of a misfire in each cylinder on the basis of the measured period of the reference signal for each corresponding one of the engine cylinders;

e) determining whether a fuel supply to the engine is cut off or carried out according to the detected engine driving condition;

f) setting a first correction coefficient ($KT_i$, i=1, - - -, n) for each measured period of the reference signals so that stepwise variations ($\Delta T$) in the periods of the reference signals consecutively measured for all of the cylinders are mutually equal to one another when determining, at the step e), that the fuel supply to the engine is cut off;

g) determining whether, at the step d), the absence of the misfire occurs in any engine cylinder; and h) setting a second correction coefficient ($KKT_i$, i=1, - - -, n) for each measure period of the reference signals so that the respective periods of the reference signals for all of the engine cylinders, which are corrected according to the first correction coefficients, are equal to an average value ($T_{AVE}$) of the respective periods of the reference signals when determining, at the step d), that the fuel supply to the engine is carried out and when determining, at the step e), that the absence of the misfire occurs in any engine cylinder, wherein said step d) further comprises the steps of: i) correcting the periods of the respective reference signals continuously measured for all of the engine cylinders according to either or both of the second and first correction coefficients and j) determining whether the misfire occurs in any engine cylinder on the basis of the corrected periods of the reference signals at the step i).

BEST MODE FOR CARRYING OUT THE INVENTION

Reference will hereinafter be made to the drawings in order to facilitate a better understanding of the present invention.

Figure 1A:
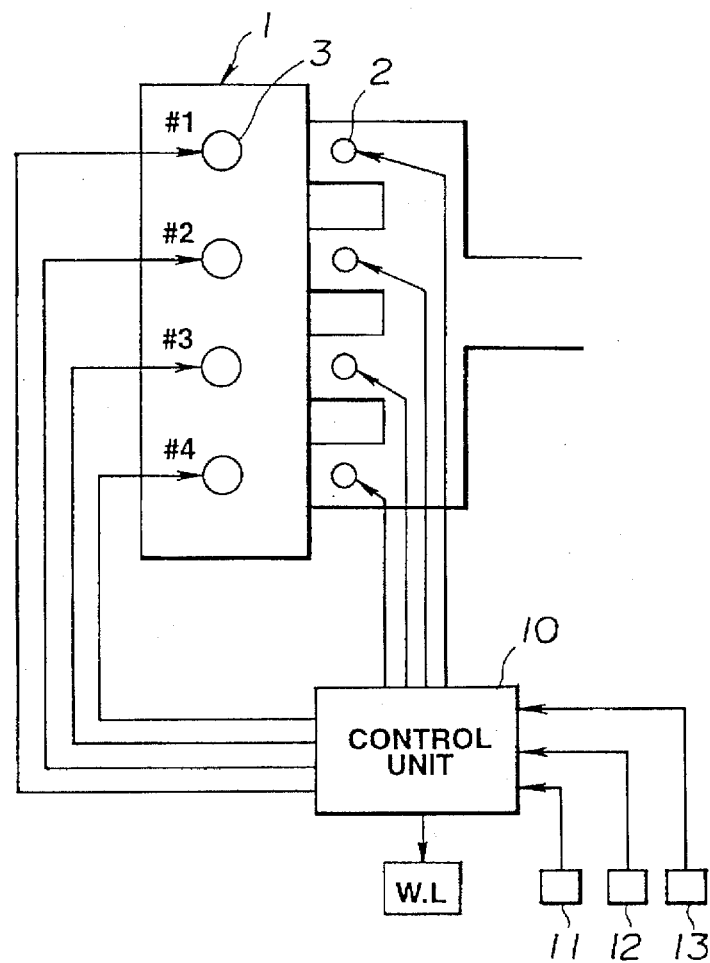
FIG. 1A is a system configuration of an apparatus for recognizing a misfire occurrence in a multi-cylinder (four-cylinder) internal combustion engine in a preferred embodiment according to the present invention.

FIG. 1A shows a system configuration of an apparatus for recognizing a misfire occurrence in any one of engine cylinders in a four-cylinder (four-stroke) internal combustion engine in a preferred embodiment according to the present invention.

In FIG. 1A, the misfire occurrence recognizing apparatus of the preferred embodiment according to the present invention is applicable to a four-cylinder, four-stroke internal combustion engine generally denoted by 1.

Figure 1B:
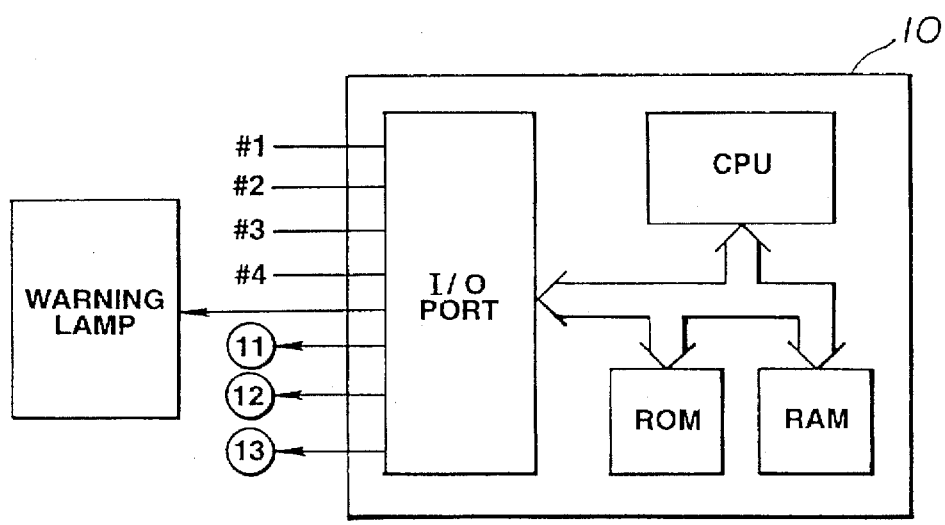
FIG. 1B is a circuit block diagram of a control unit shown in FIG. 1A.

In FIG. 1A, a control unit 10, which includes a microcomputer as shown in FIG. 1B, receives sensor signals from various types of engine driving condition detecting sensors, carry out calculation processing on the basis of the sensor signals, and outputs drive signals to a plurality of fuel injection valves 3 installed for respective cylinders (first cylinder denoted by #1, second cylinder denoted by #2, third cylinder denoted by #3, and fourth cylinder denoted by #4) and to ignition plugs 2 installed for the respective cylinders.

The various types of the engine driving condition sensors include: a crank angle sensor 11 generally having a ring gear and an electromagnetic pick-up installed so as to face the ring gear on, for example, an engine crankshaft: an airflow meter 12; and an engine idling switch The crank angle sensor 11 outputs a reference signal REF whenever an engine crankshaft has rotated through 180° in the case of the engine shown in FIG. 1A ($180^2=720°/n$ and n indicates 4) and outputs a unit angle signal (1° or 2°) whenever the engine crankshaft has rotated through the unit of angle, these reference signal REF and the unit angle signal being outputted to the control unit 10. The control unit 10 calculates an engine revolution speed from either of the reference signal or the unit angle signal received thereat.

The reference signal includes a cylinder number identifying signal having a pulsewidth wider than any other reference signals output from the crank angle sensor 11 so that the control unit 10 can identify the cylinder number whenever the cylinder number identifying signal is received. It is noted that an ignition order of the engine cylinders in the four-cylinder engine shown in FIG. 1A is predetermined as #1→#3→#4→#2 and the cylinder number identifying signal is output whenever a piston of, for example, the first cylinder has reached to a crank angular position corresponding to four strokes. The control unit 10 can, thus, identify the cylinder number to be ignited according to the receipt of the cylinder number identifying signal from the crank angle sensor 11.

The structure of the crank angle sensor 11 is exemplified by a U.S. Pat. No. 5,047,943 issued on Sep. 10, 1991 (the disclosure thereof being herein incorporated by reference).

The airflow meter 12 is, for example, of a hot-wire type and is capable of detecting intake air quantity Q of the engine shown in FIG. 1A.

The engine idling switch 18 is turned on to indicate that the engine falls in an engine idling condition when an engine throttle valve is fully closed.

The control unit 10 calculates a basic fuel injection quantity Tp on the basis of the determined intake air quantity Q from the sensor signal of the airflow meter 12 and the determined engine revolution speed N from the reference signal of the crank angle sensor 11 using the following equation: Tp=K·Q/N, wherein K denotes a constant. The control unit 10 calculates a final fuel injection quantity Ti with various types of correction coefficients of COEF made for the basic fuel injection quantity Ti as follows: Ti=Tp ·COEF.

The control unit 10 then outputs a pulse drive signal having a pulsewidth corresponding to the final fuel injection quantity Ti to each fuel injection valve at a predetermined timing, which is synchronized with the engine revolution so as to execute the fuel injection through the fuel injection value for each cylinder is noted that the control unit 10 halts the output of the fuel injection pulse drive signal to each fuel injection valve 2 (a fuel supply to the engine is cut off) when the engine is decelerated (the engine idling switch 13 is turned on) and the engine revolution speed N is equal to or above a predetermined fuel cut-off revolution speed. The fuel supply cut-off is released when the engine revolution speed N becomes lower than a predetermined fuel supply recovery revolution speed or when the engine idling switch 13 is turned off from a turned on state.

The control unit 10 determines an ignition timing on the basis of the engine revolution speed N and the basic fuel injection quantity Tp and controls an ignition of ignition plug 2 installed for each cylinder at the determined ignition timing.

In addition, the control unit 10 executes a misfire occurrence recognizing routine shown in FIGS. 2, 3, 4, and 5 (subroutines shown in FIGS. 6 and 7) to recognize an occurrence of misfire in any engine cylinder or no occurrence of the misfire in each engine cylinder and to issue a warning signal when the control unit 10 continuously recognizes the occurrence of the misfire.

FIG. 1B shows an internal circuit of the control unit 10.

The control unit 10 includes a microcomputer having a CPU, ROM, RAM, an I/O Port, and a common bus. The I/O Port includes a timer, which will be described later.

An operation of the control unit 10 for recognizing the occurrence of the misfire in the four-cylinder internal combustion engine shown in FIG. 1A will be described below with reference to FIGS. 2 through 8.

Figure 2:
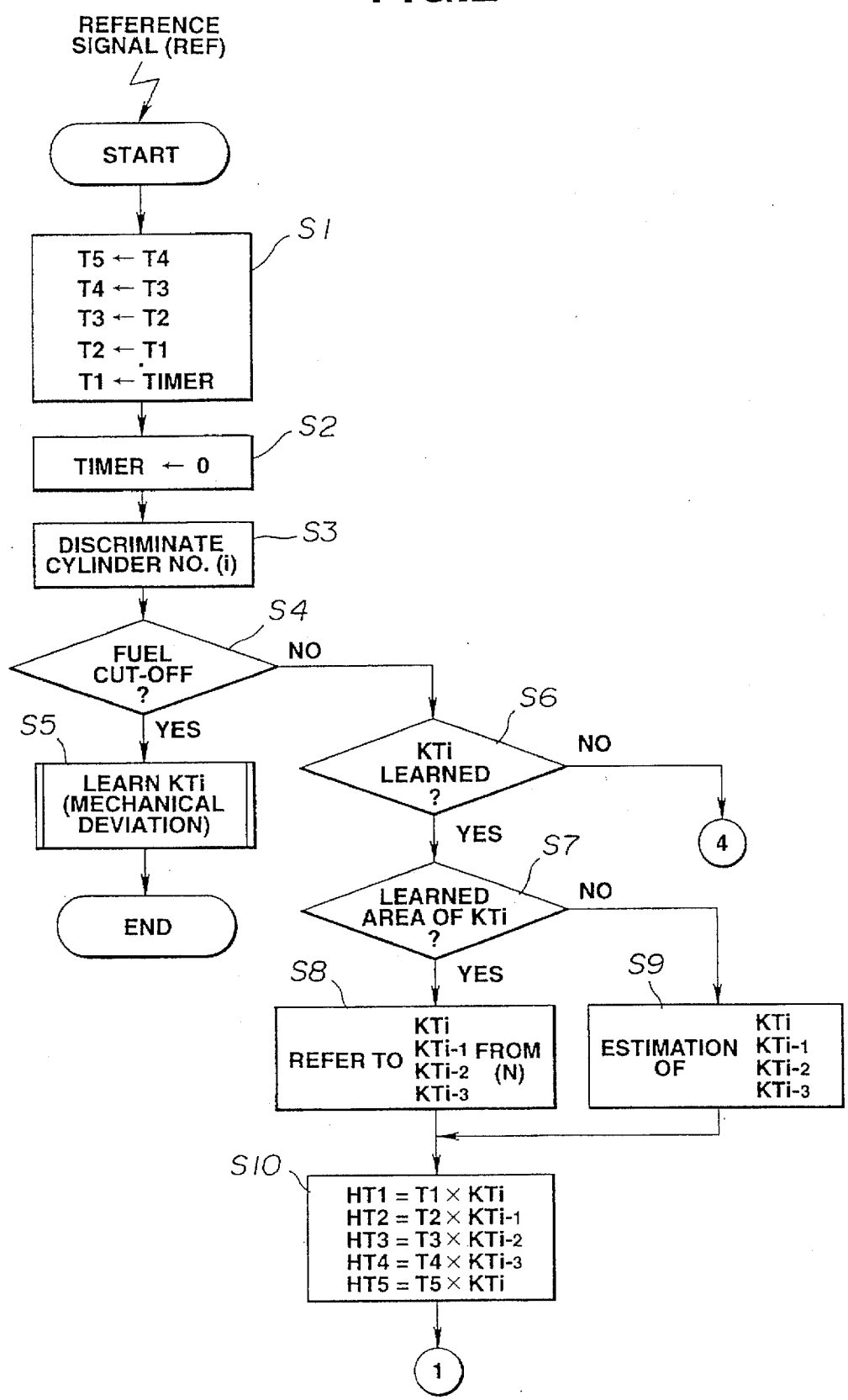
FIGS. 2, 3, and 4 are integrally a flowchart executed by the control unit shown in FIGS. 1A and 1B representing a misfire occurrence recognizing routine.
Figure 3:
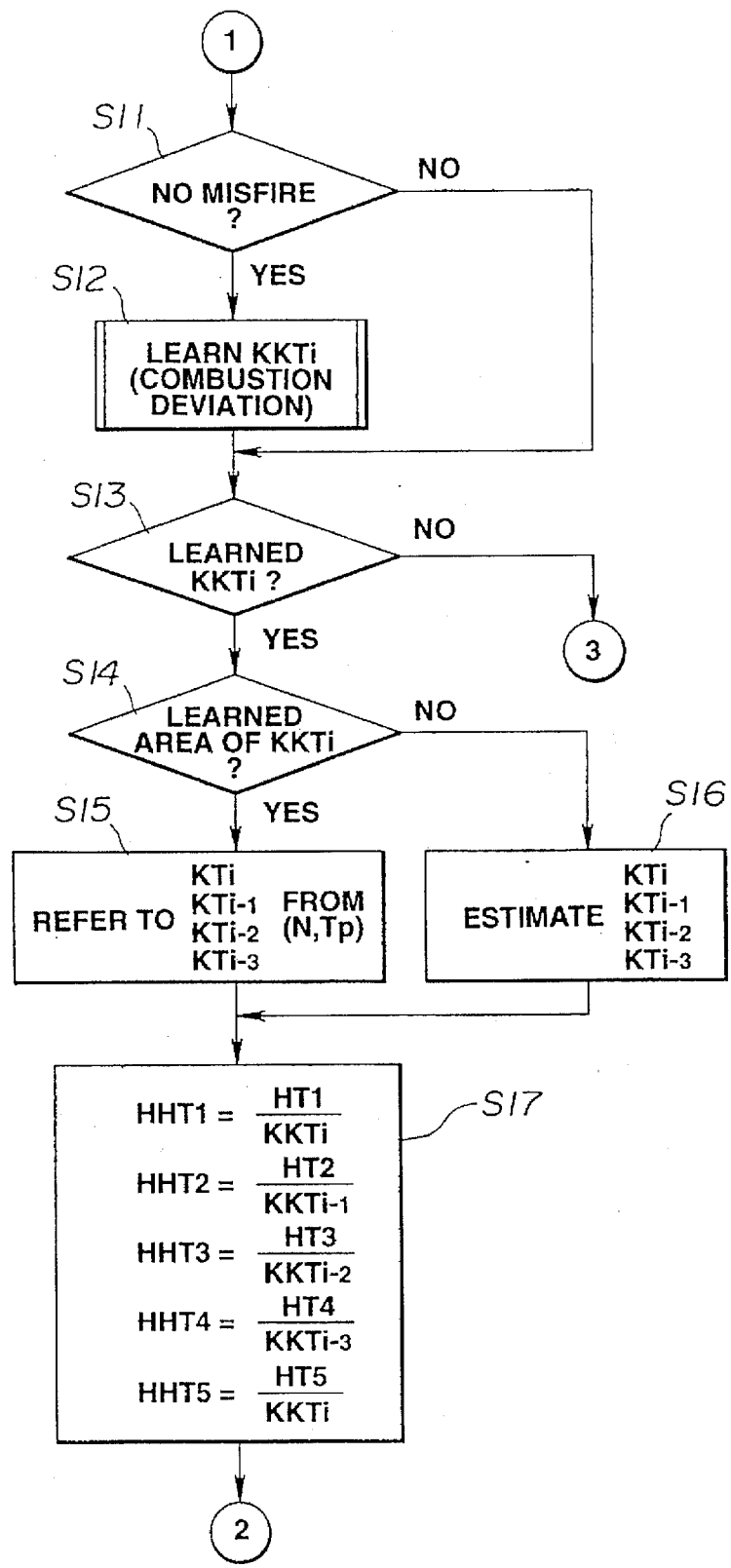
Figure 4:
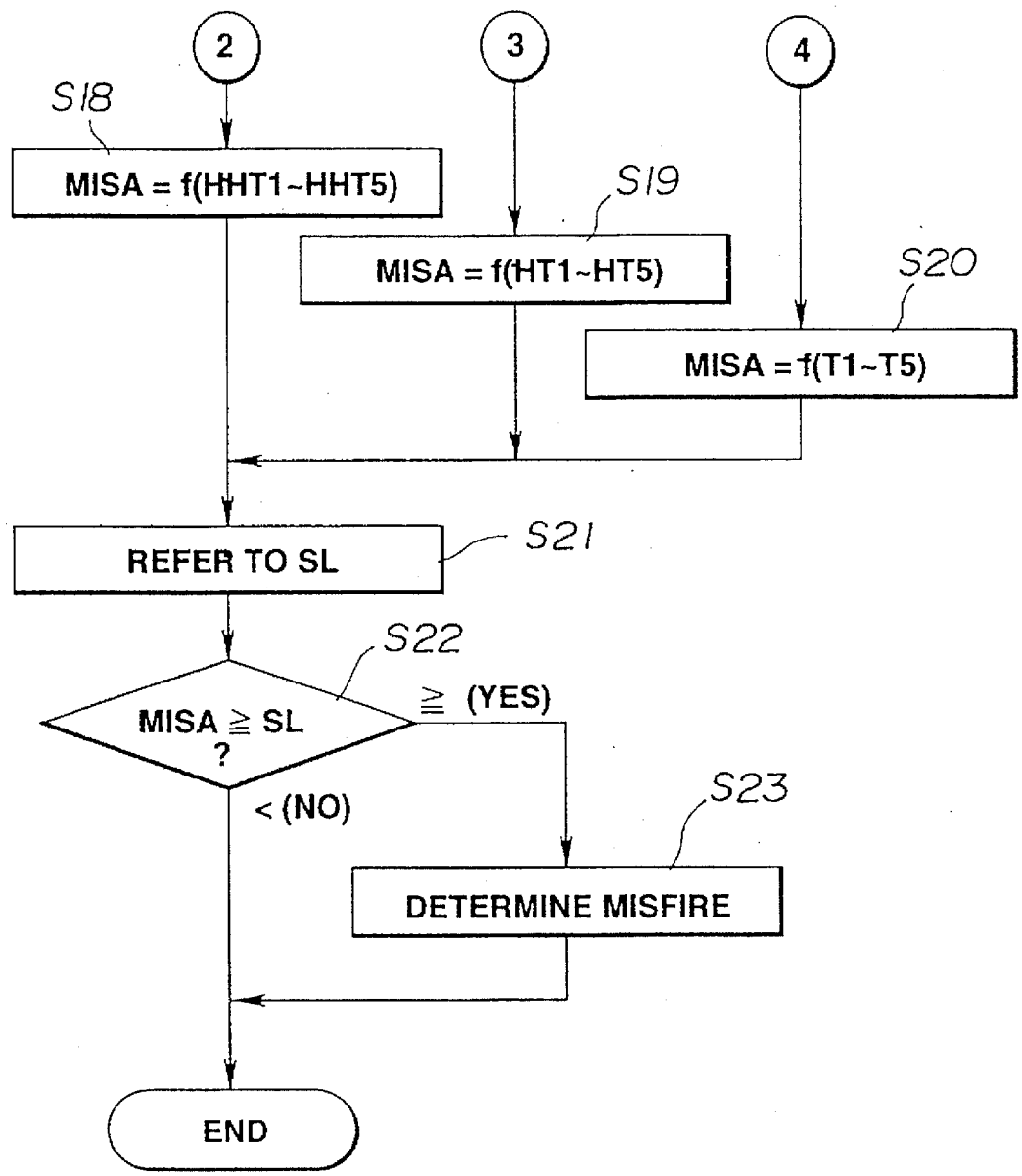

The misfire occurrence recognizing routine shown in FIGS. 2 through 4 is executed in synchronization with a generation of each reference signal REF from the crank angle sensor 11.

At a step S1, the CPU (Central Processing Unit) of the control unit 10 shown in FIG. 1B stores data of five latest values (T1 through T5) of measured periods of the reference signals REF, in the case off the four-cylinder internal combustion engine, into the RAM (Random Access Memory) and carries out the following misfire occurrence recognition on the basis off the five latest values of the periods. Therefore, at the step S1, the following periods used in a previously executed routine of FIGS. 2 through 4 are updated:

T5←T4, T4←T3, T3←T2, and T2←T1.

At the same time as the step S1, the timer used to measure each period of the reference signals inputted thereat is read and the measured period is set to T1 (T1 ← timer value).

It is noted that the timer has been started at the previously measured routine so that the period of the latest reference signal is measured by the timer as T1.

At a step S2, the CPU resets the timer to restart the measurement of the subsequent incoming reference signal.

At a step S3, the CPU carries out the cylinder number identification, i.e., the CPU determines one of the engine cylinders in which a combustion of fuel supplied thereinto has generally ended, at the present time. It is noted that the cylinder number identified cylinder is denoted by i. Thus, one of the cylinders to be determined whether an absence or presence of the misfire at the present routine is newly denoted by i and the period of the reference signal corresponding to a combustion state of the presently determined cylinder i is measured as T1.

It is also noted that since the ignition order (sequence) of the four-cylinder engine 1 shown in FIG. 1A is as follows: #1→#3→#4→#2, (i–1)-the number cylinder, which is one cylinder before the i-the number cylinder, (i–2)-the number cylinder, which is two so cylinders before the i-the number cylinder, and (i–3)-the number cylinder, which is four cylinders before the i-the number cylinder, are listed below:

| i | when i = #1 | when i = #3 | when i = #4 | when i = #2 | Periods of T1 and T5 |
|---|---|---|---|---|---|
| i - 1 | i = #2 | i = #1 | i = #3 | i = #4 | Period of T2 |
| i - 2 | i = #4 | i = #2 | i = #1 | i = #3 | Period of T3 |
| i - 3 | i = #3 | i = #4 | i = #2 | i = #1 | Period of T4 |

At a step S4, the CPU determines whether the fuel supply to the engine 1 is currently cut off.

If the fuel supply to the engine 1 is cut off at the step S4, the routine goes to a step S5.

If the fuel supply is not currently cut off at the step S5, the routine goes to a step S6.

[While the fuel supply is cut off at the step S4]

At the step S5, the first correction coefficient KTi is set to learn a mechanical deviation due to the ring gear arrangement deviation in the crank angle sensor 11 and due to the receipt circuit characteristic deviation such as an electromagnetic pick-up constituting the crank angle sensor 11.

Figure 5:
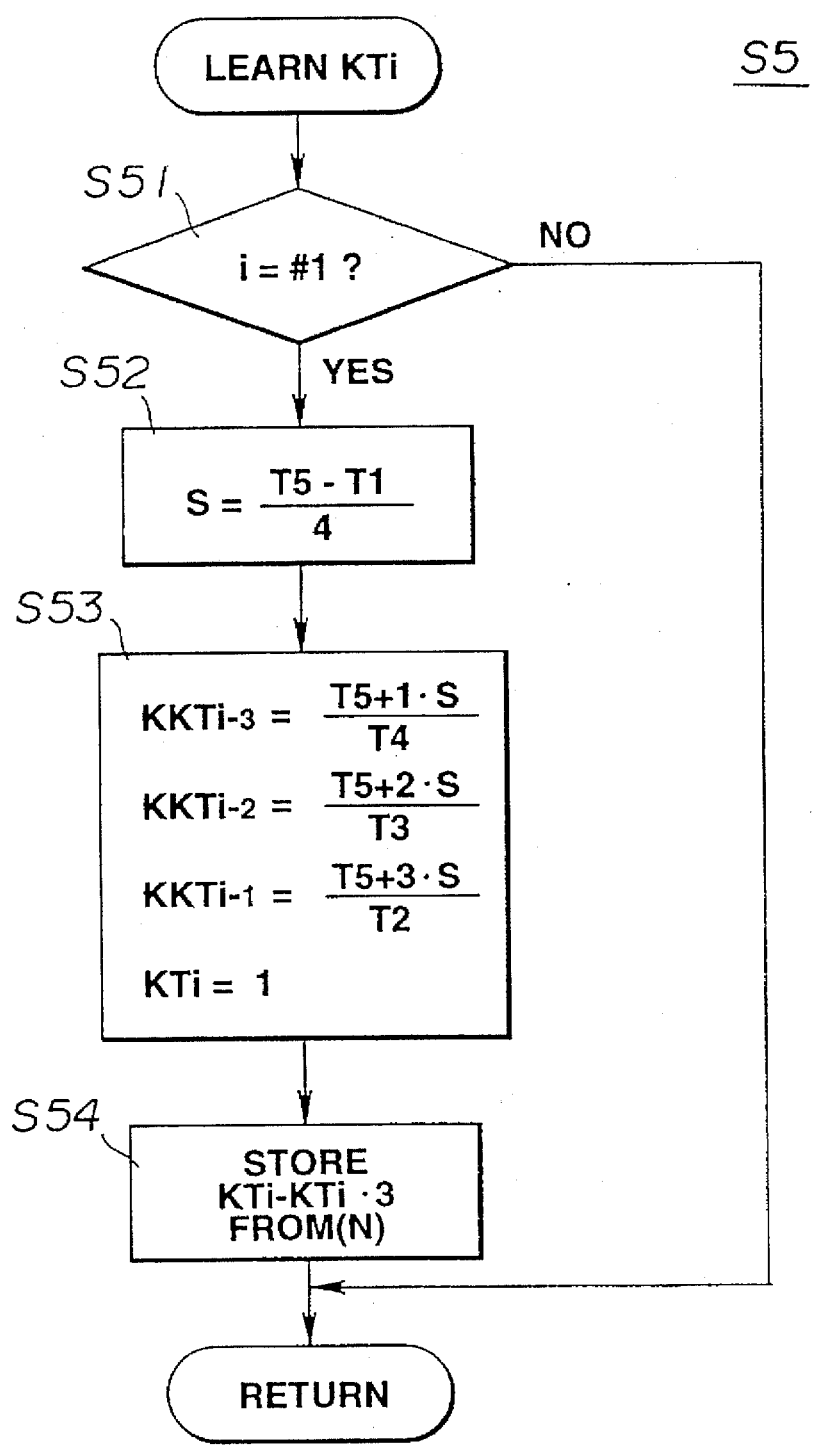
FIG. 5 is a flowchart of a subroutine executed in a step S5 shown in FIG. 2.

Therefore, the learning subroutine shown in FIG. 5 on the first correction coefficient $KT_i$ will be described below.

At a step S51, the CPU determines, with a learning representative cylinder set to #1, whether the result of the cylinder number identification i is not #1.

Only if i=#1 at the step S51 (YES), the steps of S52 through S54 are executed.

At a step S52, the CPU calculates a variation of ($\Delta T$= T5−T1) of the period of the reference signal corresponding to a combustion state of the previously set learning representative cylinder #1 within a given crank angle of 720° on the basis of the result of the period measurement during the fuel supply cut-off.

The variation $\Delta T$ is divided by the number of cylinders n=4 so as to calculate an ideal stepwise variation quantity (rate) S as defined below:

$$S=(T5-T1)/4$$

Figure 7:
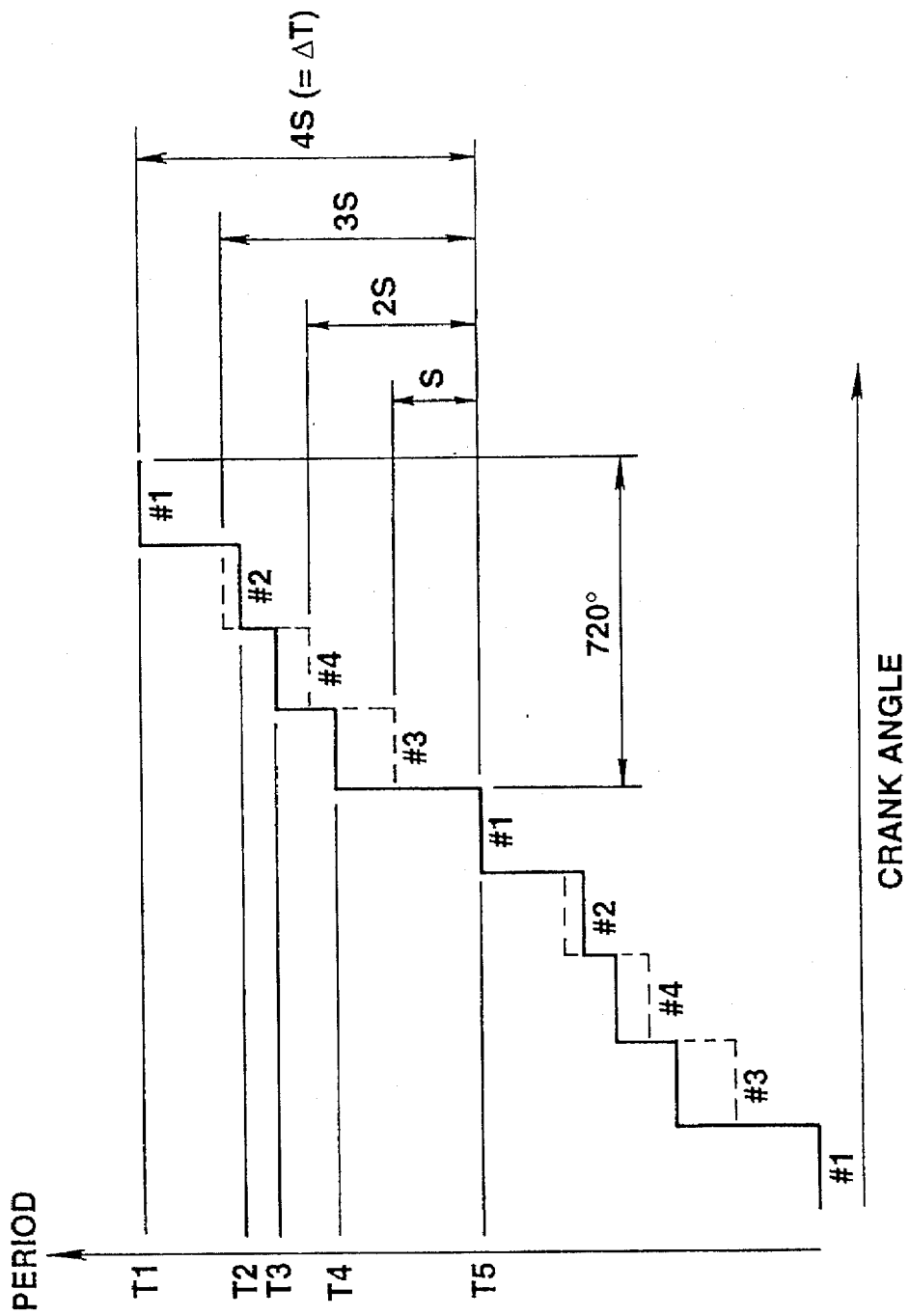
FIG. 7 is an explanatory view for explaining a variation in a period of a reference signal when a fuel supply to the engine shown in FIG. 1 is cut off.

FIG. 7 shows the derivation of the ideal stepwise variation quantity S,

At a step S53, the CPU calculates a ratio of an ideal period obtained as described below to each period T4 to T1 actually measured during the given crank angle interval of 720°. The ideal period is calculated by adding a product between the stepwise variation quantity S and the cylinder number j (j=1 to 4) counted from the learning representative cylinder #1. The ideal ratio is used to set the first correction coefficients $KT_{i-3}$ to $KT_i$ for the respective cylinders as defined below.

Cylinder number i–3 (when i=#1, the third cylinder #3): $KT_{i-3}$=(T5+1·S)/T4.

Cylinder number i–2 (when i=#1, the fourth cylinder #4): $KT_{i-2}$=(T5+2·S)/T3.

Cylinder number i–1 (when i=#1, the second cylinder #2): $KT_{i-1}$=(T5+3·S)/T2.

Cylinder number i (when i=#1, the first cylinder #1): $KT_i$=(T5+4·S)/T1=T1/T1=1.

It is noted that since the cylinder number i (#1 cylinder) is the learning representative cylinder, it is not necessary to calculate the corresponding learning correction coefficient.

At a step S54, the CPU writes the first correction coefficients KTi to $KT_{i-3}$ into respective memory regions of a map prepared in the RAM corresponding to the present engine revolution speed N. It is, however, noted that since the present $KT_i$ is always 1, it is not necessary to write $KT_i$ into the map if it is stored into another memory region.

If each first correction coefficient already stored in the map is denoted by $KT_{i-old}$ (the initial value is 1) and each newly calculated first correction coefficient is denoted by $KT_{i-old}$, $KT_{i-new}$ is calculated from the following equation. Then, it is desirable to update the old one to newly calculated $KT_{i-new}$.

$$KT_{i-new}=(1-1/a)\cdot KT_{i-old}+(1/a)KT_i$$

In the above equation, a denotes a weighting constant.

The present misfire occurrence determination routine is ended according to the above-described processing during the fuel supply cut-off.

[When the fuel supply is not cut off]

At the step S6, the CPU determines whether the learning for the mechanical deviation have been carried out, namely, whether the learning of the first correction coefficients (write of the first correction coefficients into the corresponding map) are carried out equal to or above a predetermined number of times.

If the learning described above have been carried out (YES) at the step S7, the CPU determines whether a learned area for each region of the present engine revolution speed N has been carried out.

In the case of the learned area (YES) at the step S8, the routine goes to a step S8. If the learned area is not present in each region of the present engine revolution speed N (NO) at the step S7, the routine goes to a step S9.

At the step S8, the CPU searches for the first correction coefficients $KT_i$ to $KT_{i-3}$ corresponding to the present engine revolution speed N from the maps for cylinder number i-th number cylinder to (i–3)-th number cylinder and the routine goes to a step S10.

At the step S9, the CPU searches the first correction coefficients $KT_i$ to $KT_{i-3}$ adjacent to the present engine revolution speed N from the map of cylinder number i to (i–3) and multiplies a coefficient K1, which is inversely proportional to the engine revolution speed N, so that the first correction coefficients $KT_i$ to $KT_{i-3}$ are estimated.

At the step S10, the CPU corrects data of T1 through T5 on the periods of the reference signals to determine the misfire occurrence according to the first correction coefficients $KT_i$ to $KT_{i-3}$ using the following equations so as to derive the corrected data of the periods of HT1 through HT5.

$HT1=T1\times KT_i$,
$HT2=T2\times KT_{i-1}$,
$HT3=T3\times KT_{i-2}$,
$HT4=T4\times KT_{i-3}$, and
$HT5=T5\times KT_i$.

At a step S11, the CPU determines whether no occurrence of the misfire is present while the previous four periods of T2 through T5 have been obtained as a learning condition of the mechanical deviation.

It is also desirable to confirm that, as the learning condition, no extreme variation in the engine revolution speed N and the basic fuel injection quantity (load) Tp occurs, both of which are parameters of the engine driving condition.

If no occurrence of the misfire is determined at the step S12 (YES), namely, the learning condition such as no occurrence of the misfire is established, the routine goes to a step S12.

Figure 6:
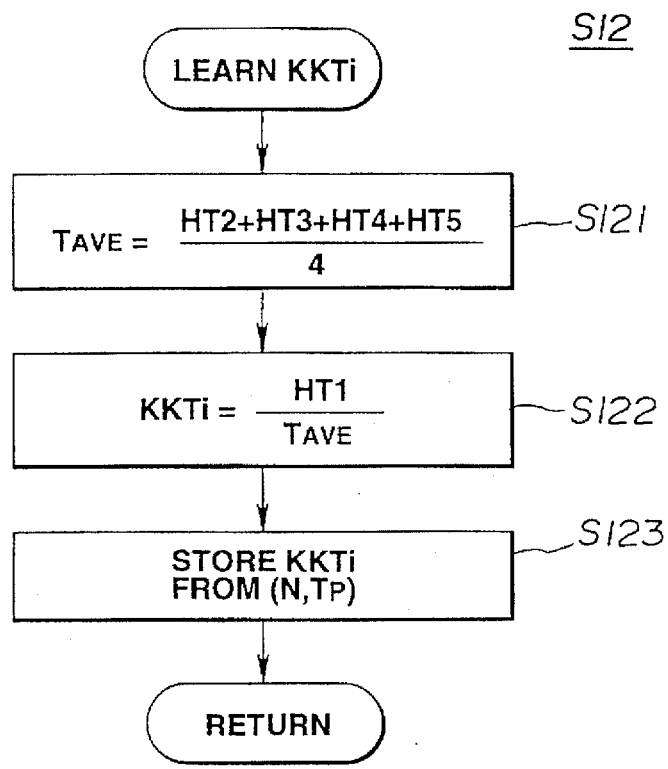
FIG. 6 is a flowchart of a subroutine executed in a step S12 shown in FIG. 3.

At a step S12, the CPU sets the second correction coefficients $KKT_i$ in accordance with the learning subroutine of the second correction coefficients of FIG. 6 in order to learn the combustion state deviations between the respective cylinders.

A subroutine at the step S12 will be described with reference to FIG. 6.

At a step S121, the CPU calculates an average value $T_{AVE}$ of the data HT2 through HT5, which are after the corrections T2 through T5 with the first correction coefficients described above as follows:

$$T_{AVE}=(HT2+HT3+HT4+HT5)/4$$

Figure 8:
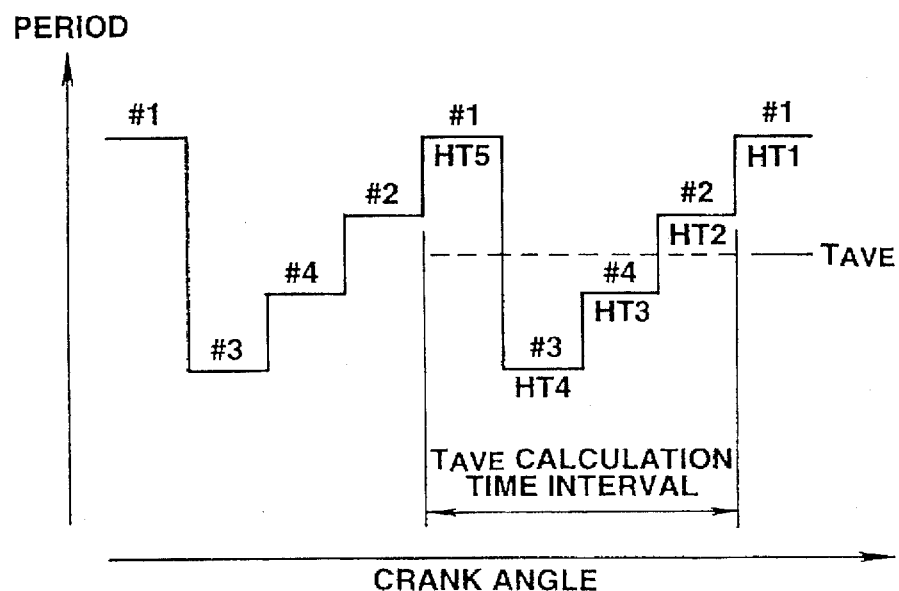
FIG. 8 is an explanatory view for explaining a variation in the period of the reference signal due to a combustion state deviation between respective engine cylinders.

A calculation time interval of the average value $T_{AVE}$ is shown in FIG. 8.

At a step S122, the CPU calculates a ratio of the data HT1, which is the latest period of the reference signal at the i-th cylinder after the correction with the first correction coefficient to the average value $T_{AVE}$, in order to set the second correction coefficients $KKT_i$ for the respective cylinders according to the calculated ratio described above.

That is to say, the second correction coefficient for the corresponding i-th cylinder is $KKT_i=HT1/T_{AVE}$.

At the subsequent step S123, the CPU writes the second correction coefficient $KKT_i$ into one of a plurality of regions of a map corresponding to the present engine revolution speed N and the present basic fuel injection quantity Tp, the map being prepared in the RAM of the control unit 10 for each engine cylinder.

Suppose that the second correction coefficient $KKT_i$ (initial value is 1) stored already in the corresponding one of the regions in the map is denoted by $KKT_{i-old}$ and the newly calculated second correction coefficient $KKT_i$ at the step 12:3 is denoted by $KKT_{i-new}$. It is preferable to further calculate the newly calculated second correction coefficient $KKT_{i-new}$ and to update the content of the corresponding one of the regions described above.

It is noted that a denotes the weighting coefficient in the following equation.

$$KKT_{i-new}=(1-1/a)\cdot KKT_{i-old}+(1/a)KKT_i$$

At a step S13, the CPU determines whether the learning of the combustion state deviation between the respective cylinders, namely, the learning on the second correction coefficients (writes of the second correction coefficients into the maps) have been carried out by equal to or more than a predetermined number of times.

If the learning area ended (YES) at the step S13, the routine goes to a step S14.

At the step S14, the CPU further searches whether it is the learning area (already learned) for the region corresponding to the present engine driving condition (N, Tp).

If it is the learning area (YES) at the step S14 (YES), the CPU searches for the regions of the second correction coefficients $KKT_i$ through $KKT_{i-3}$ corresponding to the present engine revolution speed N and the basic fuel injection quantity Tp from the maps for the i-th to (i–3)-th cylinder. Then, the routine goes to a step S17.

If it is not the learning area (NO) at the step S14, the routine goes to a step S16.

At the step S16, the CPU searches for the second correction coefficients $KT_i$ through $KT_{i-3}$ of other regions of other maps corresponding to the present engine revolution speed N from the other maps for the i-th cylinder to (i–3)-th cylinder.

That is to say, the CPU, at the step S16, estimates the second correction coefficients ($KT_i$ through $KT_{i-3}$) of the other regions corresponding to the present engine revolution speed N from among the present engine driving condition from the other maps for the i-th cylinder to the (i–3)th cylinder when the second correction coefficients are not stored into the regions corresponding to the present engine driving condition.

Referring to FIG. 3, the CPU further corrects the data HT1 through HT5, which are corrected with the first correction coefficients of the periods of the reference signals for misfire determination with the second correction coefficients for the respective cylinders as follows:

HHT1=HT1/$KKT_i$,
HHT2=HT2/$KKT_{i-1}$,
HHT3=HT3/$KKT_{i-2}$,
HHT4=HT4/$KKT_{i-3}$, and
HHT5=HT5/$KKT_i$.

The routine, thus, is transferred from the step S17 to a step S18.

At the step S18, the CPU calculates a misfire determination value MISA from the data HHT1 through HHT5 of the periods of the reference signals using the following equations.

$$MISA=[3\times(HHT4-HHT5)+(HHT4-HHT1)]/HHT5^3$$

On the other hand, if the second correction coefficients $KKT_i$ are not learned at the step S13 (NO), the routine goes to a step S19.

At the step S19, the CPU calculates the misfire determination value MISA from the data HT1 through HT5 of the periods corrected only with the first correction coefficients $KT_i$ using the following equations:

$$MISA=[3\times(HT4-HT5)+(HT4-HT1)]/HT5^3$$

Furthermore, if the first correction coefficients $KT_i$ are not learned (NO) at the step S6, the routine goes to a step S20.

At the step S20, the CPU calculates the misfire determination value MISA from the data of T1 through T5 of the periods without correction using the following equation. Thereafter, the routine goes to a step S21.

$$MISA=[3\times(T4-T5)+(T4-T1)]/T5^3$$

At a step S21, the CPU refers to another map with the engine revolution speed N and basic fuel injection quantity (which represents an engine load) Tp as parameters and sets a reference value SL.

At a step S22, the CPU compares the misfire determination value MISA calculated at any one of the steps S18, S19, or S20 with the reference value SL.

If MISA≧SL at the step S22 (YES), the routine goes to a step S22.

At the step S22, the CPU determines that the misfire occurs.

If MISA<SL at the step S22, the present routine is ended.

It is noted that the misfire determination value may be replaced with and alternative misfire determination value MISB calculated as follows:

$$MISB=[2\times(HHT3-HHT5)-2\times(HHT3-HHT1)]/HHT^3$$

Or, $$MISB=[2\times(HT3-HT5)+2\times(HT3-HT1)]/HT^3$$

Or, $$MISB=[2\times(T3-T5)+2\times(T3-T1)]/T5^3$$

In addition, with three latest values of misfire determination values MISB1 through MISB2 stored for the MISB, the following MISC may be used as the misfire determination value.

MISC=MISB–MISB3.

For these misfire determination values, the occurrence of the misfire may be determined if MISB≧predetermined value and MISC≧predetermined value.

It is also noted that if the misfire is determined to occur at the step S23 and the determination of the misfire occurrence is continuously repeated by a predetermined number of times, the CPU issues the warning signal to the warning lamp shown in FIGS. 1A and 1B to indicate the misfire occurrence. It is finally noted that the CPU identifies the cylinder number of any cylinder in which the misfire has occurred.

It is noted that the airflow meter 12 may representatively serve to detect an engine load.

What is claimed is:

1. A misfire recognizing apparatus for a multi-cylinder internal combustion engine, comprising:

a) a reference signal generating sensor for generating and outputting a reference signal (REF) for each predetermined crank angle rotation of an engine crankshaft, which angle rotation is expressed by 720°/n, where n denotes a number of engine cylinders within the engine, and said reference signal including a cylinder number identifying signal indicative of one of the engine cylinders;

b) a second sensor for detecting an engine driving condition other than an engine revolution speed; and c) a control unit including:

d) period measuring means for measuring a period of the reference signal for each predetermined crank angle rotation, the reference signal period corresponding to a combustion state of a corresponding one of the engine cylinders;

e) misfire occurrence determining means for determining a presence or absence of misfire in each cylinder based on the measured period of the reference signal for the corresponding one of the engine cylinders;

f) first determining means for determining whether a fuel supply to the engine is cut off or carried out based on the detected engine driving condition;

g) first correction coefficient setting means for setting a first correction coefficient ($KT_i$, where i=1to n in increments of 1) for each measured period of the reference signals so that stepwise variations (ΔT) in the periods of the reference signals consecutively measured for all of the cylinders are mutually equal to one another when said first determining means determines that the fuel supply to the engine is cut off;

h) second determining means for determining whether the misfire occurrence determining means has determined the absence of misfire in any the engine cylinders; and i) second correction coefficient determining means for setting a second correction coefficient ($KKT_i$, where i=1 to n in increments of 1) for each measured period of the reference signals so that the respective periods of the reference signals for all of the engine cylinders, which are corrected according to the first correction coefficients set by the first correction coefficient setting means, are equal to an average value ($T_{AVE}$) of the respective periods of the reference signals when the first determining means determines that the fuel supply to the engine is carried out and when said second determining means determines that the misfire occurrence determining means has determined the absence of misfire in any of the engine cylinders, wherein said misfire occurrence determining means comprises:

j) correction means for correcting the periods of the respective reference signals continuously measured for all of the engine cylinders according to either or both of the first and second correction coefficients set by said first and second correction coefficient setting means and said misfire occurrence determining means determines the absence or presence of misfire in any engine cylinder based on the corrected periods of the reference signals by said correction means.

2. A misfire recognizing apparatus for a multi-cylinder internal combustion engine as claimed in claim 1, wherein said first correction coefficient setting means comprises:

k) ideal stepwise variation calculating means for calculating a stepwise variation ΔT of one of the periods of the reference signals corresponding to the combustion state of each corresponding one of the cylinders representing a previously set learning representative cylinder within a given crank angle of 720° corresponding to four strokes of the engine and dividing the calculated stepwise variation ΔT by the number of the cylinders (n) to calculate an ideal stepwise variation (S); and l) first correction coefficient calculating means for calculating the first correction coefficient $KT_i$ for each cylinder from a ratio between the measured period (Ti, where i=1 to n in increments of 1) of the reference signal for the corresponding one of the cylinders within the given crank angle of 720° and an ideal period derived by adding the measured period of one of the reference signals for the previously set learning representative cylinder at a first interval of the given crank angle of 720° to a product of the ideal stepwise variation S and of the cylinder number counted from the previously set learning representative cylinder.

3. A misfire recognizing apparatus for a multi-cylinder internal combustion engine as claimed in claim 2, wherein n=4 and wherein the first correction coefficient for each cylinder is expressed as:

$KT_{i-3}=(T5+1 \cdot S)/T4$,
$KT_{i-2}=(T5+2 \cdot S)/T3$,
$KT_{i-1}=(T5+3 \cdot S)/T2$, and
$[KT_1]\ KT_i=(T5+4 \cdot S)/T1=T1/T1=1$, where i−3 denotes (i−3)-th cylinder, i−2 denotes (i−2)-th cylinder, i−1 denotes (i−1)-th cylinder, and i denotes the previously set learning representative cylinder and i=1.

4. A misfire recognizing apparatus for a multi-cylinder internal combustion engine as claimed in claim 3, wherein said second correction coefficient setting means comprises:

m) average value calculating means for calculating the average value $T_{AVE}$ of the periods of the respective reference signals for all of the engine cylinders corrected according to the first correction coefficients while said misfire occurrence determining means has determined the absence of misfire in all of the engine cylinders; and n) second correction coefficient calculating means for calculating the second correction coefficients for the respective cylinders from a ratio between the corrected periods of the reference signals according to the first correction coefficients for the respective periods of the reference signals for the cylinders and the average value $T_{AVE}$ calculated in the average calculating means.

5. A misfire recognizing apparatus for a multi-cylinder internal combustion engine as claimed in claim 4, wherein the average value $T_{AVE}$ is expressed as:

$$T_{AVE}=(HT2+HT3+HT4+HT5)/4$$

where HT2 is expressed as $[HT2=]T2 \times KT_{i-1}$, HT3 is expressed as $T3 \times KT_{i-2}$, HT4 is expressed as $T4 \times KT_{i-3}$, and HT5 is expressed as $T5 \times KT_i$, and wherein the second correction coefficients for the respective cylinders are expressed as:

$$KKT_i=HTi/T_{AVE}$$

where HT1 is expressed as $[HT1=]T1 \times KT_i$.

6. A misfire recognizing apparatus for a multi-cylinder internal combustion engine as claimed in claim 5, wherein said first correction coefficient setting means further comprises first correction coefficient storing means for storing the first correction coefficients for the respective cylinders in respective memory regions corresponding to the engine revolution speed derived according to the reference signals from the reference signal generating sensor.

7. A misfire recognizing apparatus for a multi-cylinder internal combustion engine as claimed in claim 6, wherein said second sensor comprises a sensor arranged for detecting an engine load and wherein said second correction coefficient setting means comprises second correction coefficient storing means for storing the second correction coefficients for the periods of the respective reference signals in respective memory regions corresponding to the detected engine load and the engine revolution speed.

8. A misfire recognizing apparatus for a multi-cylinder internal combustion engine as claimed in claim 7, wherein said misfire occurrence determining means comprises: o) first correction coefficient learning determining means for determining whether the first correction coefficients have been learned according to the first correction coefficients storing means; p) second correction coefficient learning determining means for determining whether the first correction coefficients for determining whether the second correction coefficients have been learned according to the second correction coefficients storing means; q) misfire occurrence determination value calculating means for calculating a misfire occurrence determination value (MISA) according to the periods of the reference signals corrected by the first correction coefficients and by the second correction coefficients according to results of learning determinations of said first correction coefficients and second correction coefficients learning determining means; and r) misfire occurrence comparing means for comparing the calculated misfire occurrence determination value (MISA) with a reference value (SL) and determining whether the misfire occurs in any one of the cylinders according to a result of the comparison between the misfire occurrence determination value and the reference value (SL).

9. A misfire recognizing apparatus for a multi-cylinder internal combustion engine as claimed in claim 8, wherein said misfire occurrence determination value calculating means calculates the misfire occurrence determination value (MISA) as follows:

$$MISA = [3 \times (HHT4 - HHT5) + (HHT4 - HHT1)]/HHT5^3$$

where HHT4 is expressed as $HT4/KKT_{i-3}$, HHT5 is expressed as $HT5/KKT_i$, and HHT1 is expressed as $HT1/KKT_i$.

10. A misfire recognizing apparatus for a multi-cylinder internal combustion engine as claimed in claim 9, wherein when said misfire occurrence determining means determines that the misfire in any one of the cylinders occurs according to the result of the comparison between the misfire occurrence determination value and the reference value, a warning signal is output to a warning lamp indicating that the misfire occurs.

11. A misfire recognizing apparatus for a multi-cylinder internal combustion engine as claimed in claim 8, wherein said misfire occurrence determination value calculating means calculates the misfire occurrence determination value (MISA) as follows when said first and second correction coefficients learning determining means determines that the first and second correction coefficients have not been learned, respectively.: $MISA = [3 \times (H4-T5) + (T4-T1)]/T5^3$.

12. A misfire recognizing apparatus for a multi-cylinder internal combustion engine as claimed in claim 8, wherein said misfire occurrence determination value calculating means calculates the misfire occurrence determination value (MISA) as follows when the first correction coefficients learning determining means determines that the first correction coefficients have been learned and when said second correction coefficient learning means determines that the second correction coefficients have not been learned:

$$MISA = [3 \times (HT4-HT5) + (HT4-HT1)]/HT5^3.$$

13. A method for recognizing a misfire occurrence in a multi-cylinder internal combustion engine, comprising the steps of:

a) generating and outputting a reference signal (REF) for each predetermined crank angle rotation of an engine crankshaft, which angle rotation is expressed by 720°/n, where n denotes a number of engine cylinders within the engine, and said reference signal including a cylinder number identifying signal indicative of one of the engine cylinders;

b) detecting an engine driving condition other than an engine revolution speed;

c) measuring a period of the reference signal for each predetermined crank angle rotation, the reference signal period corresponding to a combustion state of a corresponding one of the engine cylinders;

d) determining a presence or absence of misfire in each cylinder based on the measured period of the reference signal for each corresponding one of the engine cylinders;

e) determining whether a fuel supply to the engine is cut off or carried out based on the detected engine driving condition;

f) setting a first correction coefficient ($KT_i$, where i=1 to n in increments of 1) for each measured period of the reference signals so that stepwise variations ($\Delta T$) in the periods of the reference signals consecutively measured for all of the cylinders are mutually equal to one another when determining, at the step e), that the fuel supply to the engine is cut off;

g) determining whether, at the step d), the absence of misfire occurs in any of the engine cylinders; and h) setting a second correction coefficient (KKTi, where i=1 to n in increments of 1) for each measured period of the reference signals so that the respective periods of the reference signals for all of the engine cylinders, which are corrected according to the first correction coefficients, are equal to an average value ($T_{AVE}$) of the respective periods of the reference signals when determining, at the step d), that the fuel supply to the engine is carried out and when determining, at the step e), the absence of misfire in any of the engine cylinders, wherein said step d) further comprises the steps of:

i) correcting the periods of the respective reference signals continuously measured for all of the engine cylinders according to either or both of the second and first correction coefficients, and j) determining whether misfire occurs in any of the engine cylinders based on the corrected periods of the reference signals at the step i).

* * * * *